United States Patent [19]

Ritter et al.

[11] 4,422,537
[45] Dec. 27, 1983

[54] ONE PIECE SHEET METAL CAGE

[75] Inventors: Joachim Ritter; Ernst Neuwirth, both of Herzogenaurach, Fed. Rep. of Germany

[73] Assignee: INA Walzlager Schaeffler KG, Fed. Rep. of Germany

[21] Appl. No.: 275,289

[22] Filed: Jun. 19, 1981

[30] Foreign Application Priority Data

Jun. 25, 1980 [DE] Fed. Rep. of Germany ....... 3023687

[51] Int. Cl.³ .............................................. F16D 41/06
[52] U.S. Cl. ..................................................... 192/45
[58] Field of Search ...................... 192/45; 188/82, 84

[56] References Cited

U.S. PATENT DOCUMENTS

| | | | |
|---|---|---|---|
| 3,055,472 | 9/1962 | Sauzedde | 192/45 |
| 3,404,760 | 10/1968 | Benson et al. | 192/45 |
| 3,537,555 | 11/1970 | Reister | 192/45 |
| 3,904,005 | 9/1975 | Husmann | 192/45 |
| 3,927,744 | 12/1975 | Hallerberg | 192/45 |

Primary Examiner—Allan D. Herrmann
Attorney, Agent, or Firm—Hammond & Littell, Weissenberger and Muserlian

[57] ABSTRACT

A one-piece sheet metal cage for an overrunning roller clutch wherein the cam rollers roll between a smooth inner races and an outer race provided with camming surfaces comprising a U-shaped sheet metal element provided in its longitudinal section with radial ends of different height, the higher end engaging the camming surfaces in a locking manner with a corresponding outer profile and the cage is provided with folding springs on radially directed segments on the cross-bars forming the cage pockets which cause the cam rollers to bear against an inner and outer retaining element of an adjacent cross-bar, each said cross-bar comprising a short segment extending in the circumferential direction at the bottom of the U-profile which forms the inner retaining elements at its axial ends adjoining the end flanges connecting the cross-bars and a flap between the inner retaining elements bent radially outward to which is secured a folding spring engaging an opening of the flap with an elastic projection, said flap being provided at its two axial ends with bent outer retaining lugs.

5 Claims, 5 Drawing Figures

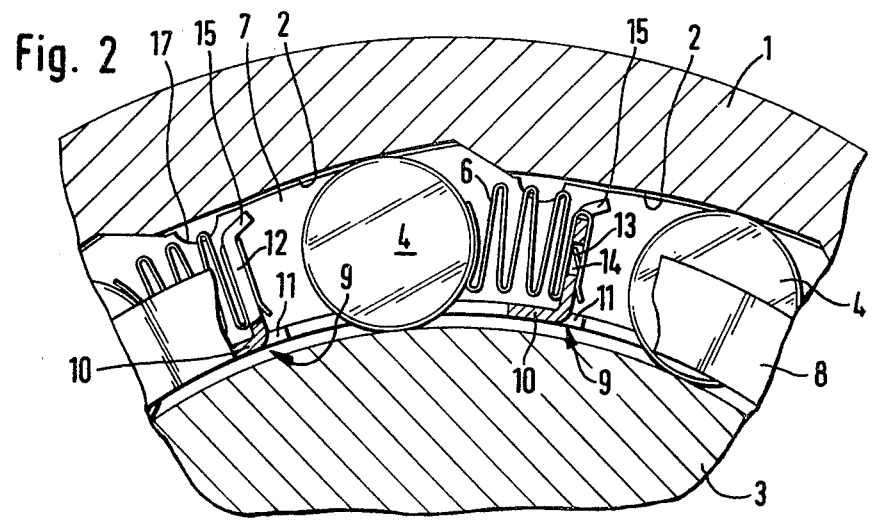
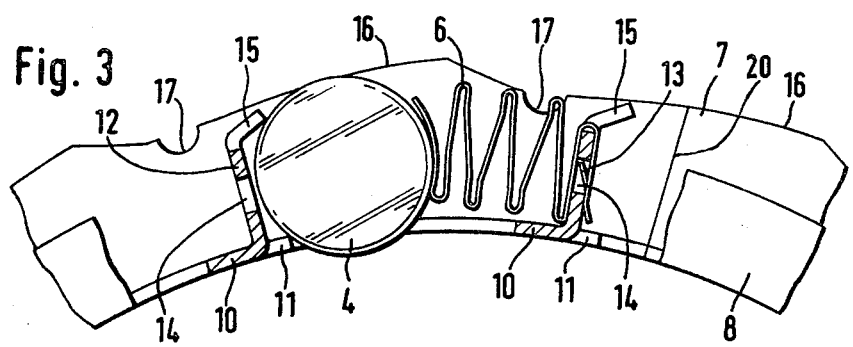
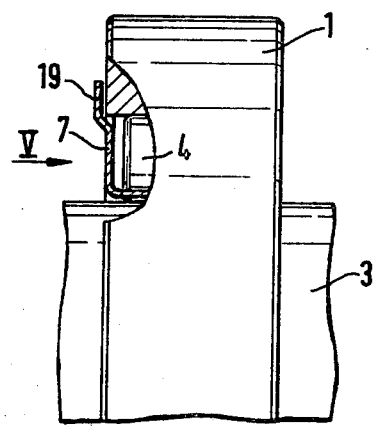
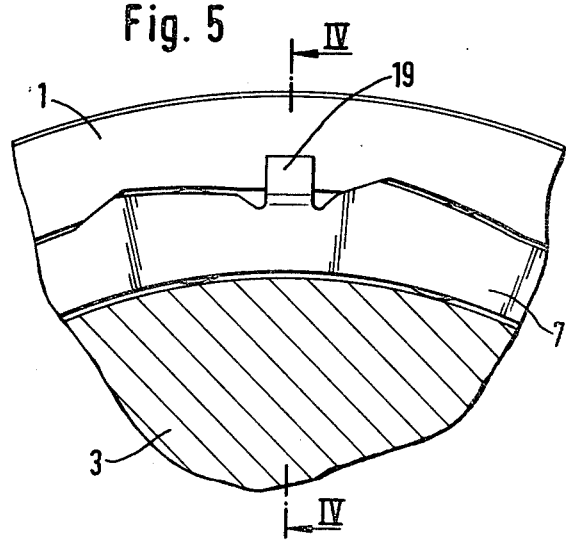

ONE PIECE SHEET METAL CAGE

STATE OF THE ART

U-shaped sheet metal cages for overrunning roller clutches are known wherein the radial ends are of different heights but these cages are comprised of several individual pieces wherein lateral rings form the radial ends and are connected with each other by segment spacing elements which serve the function of the cross-bars of the present invention. They have a considerable dimension in the cage circumferential direction for stability which is a multiple of the diameter of the cam rollers. Besides the greater manufacturing costs caused by the large number of parts which have to be joined together, the said cages have the further disadvantage that only a limited number of cam rollers can be accommodated in the cage which limits the torque transmittable.

OBJECTS OF THE INVENTION

It is an object of the invention to provide an economical single piece cage for overrunning roller clutches which is simple to produce and is extremely stable and able to accommodate a larger number of cam rollers.

This and other objects and advantages of the invention will become obvious from the following detailed description.

THE INVENTION

The novel one-piece sheet metal cage for an overrunning roller clutch wherein the cam rolls roll between a smooth inner races and an outer race provided with camming surfaces is comprised of a U-shaped sheet metal element provded in its longitudinal section with radial ends of different height, the higher end engaging the camming surfaces in a locking manner with a corresponding outer profile and the cage is provided with folding springs on radially directed segments on the cross-bars forming the cage pockets which cause the cam rollers to bear against an inner and outer retaining element of an adjacent cross-bar, each said cross-bar comprising a short segment extending in the circumferential direction at the bottom of the U-profile which forms the inner retaining elements at its axial ends adjoining the end flanges connecting the cross-bars and a flap between the inner retaining elements bent radially outward to which is secured a folding spring engaging an opening of the flap with an elastic projection, said flap being provided at its two axial ends with bent outer retaining lugs.

The prior art problems are solved in that each cross-bar consists of a segment extending in circumferential direction, due to the U-profile, which forms inner retaining elements at the axial ends adjoining the end flanges and where a flap is bent radially outward between the retaining elements to which is attached a folding spring engaging an opening of the flap in a locking manner with an elastic projection, the said flap being provided at both axial ends with bent-off outer retaining lugs. The rigid connection of the two lateral end flanges is effected in this cage by the short segments of each individual cross-bar extending in the circumferential direction at the bottom of the U-profile. Because a much greater number of cross-bars can be accommodated in this cage over the entire circumference compared to the known cage and because the conditions are more favorable from the beginning due to the one-piece cage, the segments extending in the circumferential direction of the cage can be made very short without impairing the stability of the entire cage. In this way, it is possible to reduce the total extension of the cross-bars in the circumferential direction of the cage to about half the cam roller diameter which in turn permits a much greater number of cam rollers to be accommodated than in the known cage.

Overrunning roller clutches in which such cages are installed are frequently arranged directly next to roller bearings, and they are included in the lubricating system of the roller bearings and this requires that the overrunning roller clutch as well as the roller bearing be traversed by the lubricant in axial direction. This possibility is prevented by the one end flange which engages the camming surfaces of the outer camming race in a locking manner and thus fills completely the annular clearance between the outer and inner camming races. To still permit axial passage through the clutch which is necessary for lubrication, this end flange can be provided with at least one opening which permits the necessary passage of the lubricant. Preferably a plurality of such openings are provided, for example, one for each cage crossbar to ensure that the supply of lubricant is sufficient about the entire cage circumference.

The construction of the cage of the invention as a one-piece sheet metal part also permits one to provide in a simple manner without additional costs axial securing of the cage in one direction. To this end, securing tongues extending radially to the outside can be provided on one end flange at various points distributed about the circumference which bear at the front end against the part carrying the camming surfaces. When these securing tongues are arranged on the lower of the two end flanges, they can be simply directed radially to the outside which has the result that this end flange is in its entire width outside the part carrying the camming surfaces and this has no adverse effect on the operation of the clutch. But if these securing tongues are arranged on the other end flange which engages the camming surfaces in a locking manner with its outer profile, it is necessary to double-offset them so that there is a sufficent stagger between the end flange on the one hand, and the securing tongues on the other hand.

Another simplification in the manufacture of such a sheet metal cage results from the fact that it is formed of a flat metal strip by bending and it is possible to place the two ends of the bent strip so that they abut on each other. But it is also possible to provide a joint at this point, e.g. by welding, soldering etc.

Referring now to the drawings:

FIG. 2 shows a cross-sectional view along a center plane through a clutch of FIG. 1.

FIG. 3 shows a corresponding cross-sectional view through a cage of the invention before its installation.

FIG. 4 shows a partial longitudinal sectional view along line IV—IV of FIG. 5, and FIG. 5 shows a view in the direction of arrow V of FIG. 4.

Figure 1:
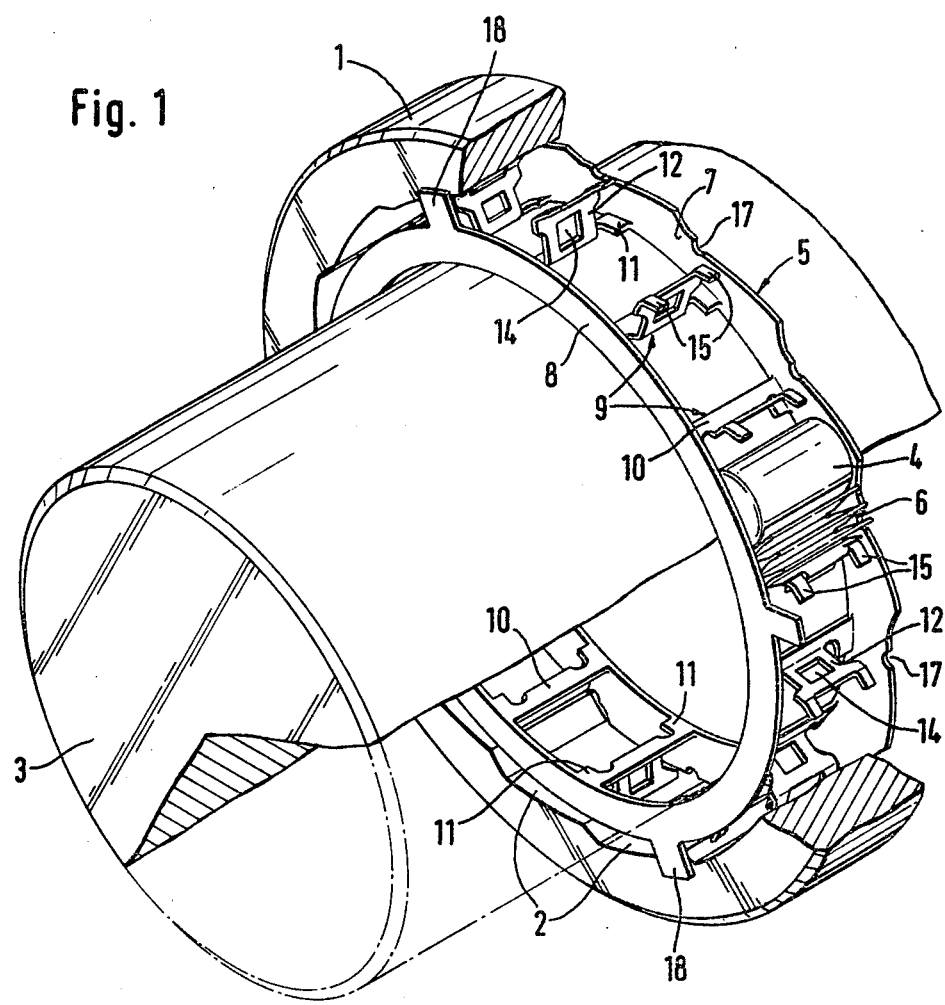
FIG. 1 shows a partial sectional perspective view of a overrunning roller clutch with a cage of the invention.

The overrunning roller clutch of FIG. 1 consists of an outer race 1 which carries camming surfaces 2 and between these camming surfaces 2 and the smooth-cylindrical surface of shaft 3 are cam rollers 4 arranged in cage 5 which are urged into a camming position under the action of folding springs 6. Cage 5 (see also FIGS. 2 and 3) is formed of two end flanges 7 and 8 which are joined to each other by cross-bars 9. The latter are each formed by a short segment 10 extending in circumferential direction which is integral with end flanges 7 and 8 and this segment 10 has at its axial ends adjoining the end flanges inner retaining elements 11 between which a flap 12 is bent radially outward. On this flap 12 is attached a folding spring 6 which engages an opening 14 of flap 12 with an elastic projection 13. Finally flap 12 has at both axial ends bent-off outer retaining lugs 15. End flange 7 which engages camming surfaces 2 of outer race 1 in a locking manner with an outer profile 16 which can be seen particularly clearly in FIG. 2 has in the proximity of each cross-bar 9 a substantially semicircular opening 17 which permits axial flow of lubricant.

FIG. 2 which shows the completely installed clutch shows clearly how cam rollers 4 are urged by folding springs 6 into the camming position so that they are in contact with camming surfaces 2 on the one hand, and with the smooth-cylindrical surface of shaft 3 on the other hand. FIG. 3 shows the cage before its installation. Folding springs 6 urge cam rollers 4 so far in the direction of an adjacent cross-bar 9 until they bear on inner retaining elements 11 and on outer retaining lugs 15 so that rollers 4 are held in the cage in both radial directions to prevent them from falling out whereby the installation of the cage in outer race 1 presents no problems.

FIG. 1 shows another possibility of providing end flange 8 at various points distributed about the circumference with securing tongues 18 which are directed radially to the outside and bear at the front end on outer race 1 so that axial fixation of the cage relative to end flange 8 in one axial direction is achieved without additional costs. End flange 8 extends in this embodiment in its entire width axially outside outer race 1 without impairing its operation in any way.

FIGS. 4 and 5 show the possibility of providing securing tongues 19 on end flange 7 which must be double-offset, however, in this case as it can be seen clearly from FIG. 4, so that end flange 7 extends axially inside outer race 1 to prevent the cage from turning relative to outer race 1.

In FIG. 3 the butt-joint is indicated at 20 which results when cage 5 is bent round from a flat sheet metal strip and in the represented embodiment, the two ends of the sheet metal strip abut in the area of butting joint 20. However it is also possible to provide at this point a rigid joint, e.g. by welding.

Various modifications of the cage of the invention may be made without departing from the spirit or scope thereof and it is to be understood that the invention is intended to be limited only as defined in the appended claims.

I claim:

1. A one-piece sheet metal cage for an overrunning roller clutch wherein the cams rollers roll between a smooth inner races and an outer race provided with camming surfaces comprising a U-shaped sheet metal element provided in its longitudinal section with radial ends of different height, the higher end engaging the camming surfaces in a locking manner with a corresponding outer profile and the cage is provided with folding springs on radially directed segments on the cross-bars forming the cage pockets which cause the cam rollers to bear against an inner and outer retaining element of an adjacent cross-bar, each said cross-bar comprising a short segment extending in the circumferential direction at the bottom of the U-profile which forms the inner retaining elements at its axial ends adjoining the end flanges connecting the cross-bars and a flap between the inner retaining elements bent radially outward to which is secured a folding spring engaging an opening of the flap with an elastic projection, said flap being provided at its two axial ends with bent outer retaining lugs.

2. The cage of claim 1 wherein the higher end flange engaging the camming surfaces in a locking manner with an outer profile is provided with at least one opening for passing of lubricant.

3. The cage of claim 1 or 2 wherein securing tongues extending radially outward are provided on one end flange at various points about, the circumference bearing on the outer race with the camming surfaces to secure the cage in one axial direction.

4. The cage of claim 3 wherein the securing tongues are double offset so that the higher end flange is inside the outer race carrying the camming surfaces.

5. The cage of claim 1 wherein it is formed by bending round a flat metal strip.

* * * * *